H. B. PARK.
SANITARY ATTACHMENT FOR MOUTHPIECES.
APPLICATION FILED NOV. 6, 1915.

1,204,307.

Patented Nov. 7, 1916.

Witnesses
F. Windridge
John J. McCarthy

Inventor
H. B. Park
By Victor J. Evans
Attorney

UNITED STATES PATENT OFFICE.

HENRY BIGHAM PARK, OF LAGRANGE, GEORGIA.

SANITARY ATTACHMENT FOR MOUTHPIECES.

1,204,307.  Specification of Letters Patent.  Patented Nov. 7, 1916.

Application filed November 6, 1915. Serial No. 60,064.

*To all whom it may concern:*

Be it known that I, HENRY BIGHAM PARK, a citizen of the United States, residing at Lagrange, in the county of Troup and State of Georgia, have invented new and useful Improvements in Sanitary Attachments for Mouthpieces, of which the following is a specification.

This invention relates to improvements in sanitary guards adapted to be attached to the mouth pieces of telephones, speaking tubes, megaphones or the like.

In carrying out the present invention it is my purpose to provide a sanitary guard of the class described which may be readily and quickly applied to the mouth piece wherein the germ catching element may be removed and replaced by a new element which is supplied with a disinfecting solution and whereby the spread of disease germs will be prevented and the germ destroyed.

With the above and other objects in view, the invention consists in the construction, combination and arrangement of parts hereinafter set forth in and falling within the scope of the claim.

Figure 1:
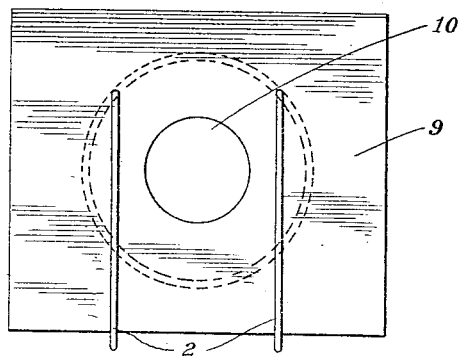
Figures 2, 3:
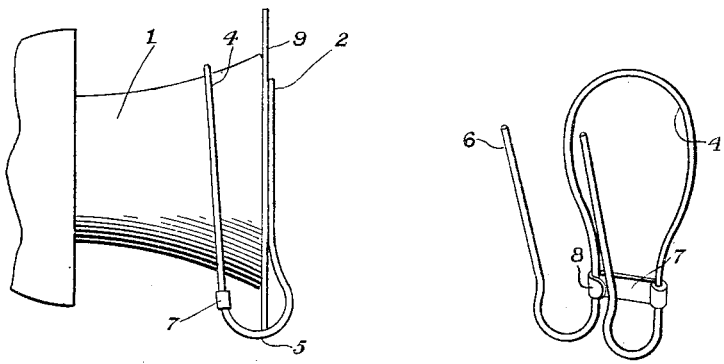

In the accompanying drawing, Figure 1 is a view in front elevation of a mouth piece equipped with a guard constructed in accordance with my present invention. Fig. 2 is a view in side elevation thereof. Fig. 3 is a perspective view of the holder for the germ catching element removed from the mouth piece.

Referring now to the drawing in detail 1 designates a mouth piece of a telephone instrument, speaking tube or the like, while 2 indicates the holder of the guard. This holder is formed with a single length of wire 3 bent upon itself between its ends into circular formation as at 4 and then extended outwardly as at 5 having the end portion bent upon the outwardly projecting portion 5 and the circular portion 4 as at 6 and spaced apart from each other.

To apply the holder to the mouth piece 1 the circular portion 3 is spaced about the mouth piece adjacent to the outwardly flared end thereof, while the backwardly bent portions 6 lie contiguous to the outer end of the mouth piece, clearly illustrated in Figs. 1 and 2 of the drawing. The outwardly projecting portions 5 of the holder are preferably secured together by means of a clamp 7 pivoted at one end of the outwardly projecting portions and having the opposite end bent upon itself to form a hook 8 adapted to engage the other portion 5 of the holder.

9 indicates the germ catching element, such element being in the form of a pad capable of disinfecting, sterilizing and deodorizing. This pad is adapted to be inserted in the backwardly bent portion 6 of the holder between such portions and the mouth piece, as clearly illustrated in Fig. 2, of the drawing. The pad is preferably formed centrally with an opening 10 to facilitate the transmission of the sound waves into the transmitter. The pad while in use is to be moistened daily with a disinfecting solution.

I claim:—

A sanitary guard for mouth pieces comprising a single length of wire bent upon itself between its ends to encircle the mouth piece and having the end portions thereof projecting outwardly and then bent backwardly contiguous to the outer edge of the mouth piece, a sanitary pad disposed between the outer end of the mouth piece and said backwardly bent portion and resting upon said outwardly projecting portion, and a clamp carried by the outwardly projecting portion of said holder and interconnecting the same to secure the circular bent portion of the guard to the mouth piece.

In testimony whereof I affix my signature in presence of two witnesses.

HENRY BIGHAM PARK.

Witnesses:
A. J. ANDREWS,
ROBT. E. BURKS.

Copies of this patent may be obtained for five cents each, by addressing the "Commissioner of Patents, Washington, D. C."